(12) United States Patent
de Buen

(10) Patent No.: US 8,392,764 B2
(45) Date of Patent: Mar. 5, 2013

(54) METHODS AND SYSTEMS FOR IDENTIFYING AND CONFIGURING NETWORKED DEVICES

(75) Inventor: Peter de Buen, Coquitlam (CA)

(73) Assignee: Cooper Technologies Company, Houston, TX (US)

( * ) Notice: Subject to any disclaimer, the term of this patent is extended or adjusted under 35 U.S.C. 154(b) by 431 days.

(21) Appl. No.: 12/619,344

(22) Filed: Nov. 16, 2009

(65) Prior Publication Data
US 2011/0119556 A1    May 19, 2011

(51) Int. Cl.
*G06F 11/00* (2006.01)
(52) U.S. Cl. ............................ 714/44; 714/56; 714/758
(58) Field of Classification Search .................. None
See application file for complete search history.

(56) References Cited

U.S. PATENT DOCUMENTS

| | | |
|---|---|---|
| 6,377,860 B1 | 4/2002 | Gray et al. |
| 6,501,368 B1 | 12/2002 | Wiebe et al. |
| 6,580,593 B2 | 6/2003 | Balakrishnan |
| 2003/0078701 A1* | 4/2003 | Sunami et al. ............... 701/1 |
| 2009/0027160 A1* | 1/2009 | Ikushima et al. ......... 340/5.61 |
| 2011/0166742 A1* | 7/2011 | Hunt et al. ................. 701/33 |

* cited by examiner

*Primary Examiner* — Christopher McCarthy
(74) *Attorney, Agent, or Firm* — Armstrong Teasdale LLP

(57) ABSTRACT

Auto-detection and configuring systems and methods for interconnected, position dependent control devices are disclosed. Embedded identification and configuration keys are associated with each of the control devices in a network, such that specific connection nodes for each controller may be determined by electronically reading the identification as the control devices are installed. Hardware and software compatibility issues may be detected and resolved, including self configuring of the control devices with the proper software where possible. Otherwise, error conditions are signaled.

28 Claims, 3 Drawing Sheets

METHODS AND SYSTEMS FOR IDENTIFYING AND CONFIGURING NETWORKED DEVICES

BACKGROUND OF THE INVENTION

The field of the invention relates generally to systems including hardware devices interconnected on a communication network, and methods of automatically identifying a connected device and configuring the device with the proper software for optimal operation of the system. More specifically, the field of the invention relates to systems and methods for detecting hardware and/or software compatibility issues and automatically configuring position dependent, interconnected hardware devices in control system networks.

Much effort has been expended in recent years to develop electronic "plug and play" technology for use in a wide variety of applications. Such technology facilitates a relatively simple interface between two different hardware devices, typically with a plug-type connection interface. Such technology also involves largely automated communication between two interfaced devices such that minimal effort is required by a user to achieve functionality of the different hardware devices with one another. Such features have become convenient and highly desirable from the perspective of hardware and software providers, as well as end users of the devices.

While existing plug and play technology works very well in some instances, it can nonetheless be problematic in other instances. For example, the full functionality of plug and play devices is typically dependent on hardware and software compatibility between the connected devices. Many end users of the devices, however, sometimes have difficulty evaluating such hardware and software compatibility issues, and as a result, instances of mismatched hardware and software have been known to occur. This is perhaps particularly so in instances wherein the functional operation of otherwise similar devices is dependent on the position or location where interconnected devices reside in a network of devices, such that different devices may be rather easily confused. As these networked devices are serviced over time and devices are disconnected, reconnected and occasionally replaced in the network, hardware and software incompatibilities may result that would compromise proper operation of the network. Such hardware and software incompatibility can be difficult to detect and diagnose in certain applications, including but not limited to electronic control systems for vehicles, and improvements are desired.

DETAILED DESCRIPTION OF THE INVENTION

Figure 1:
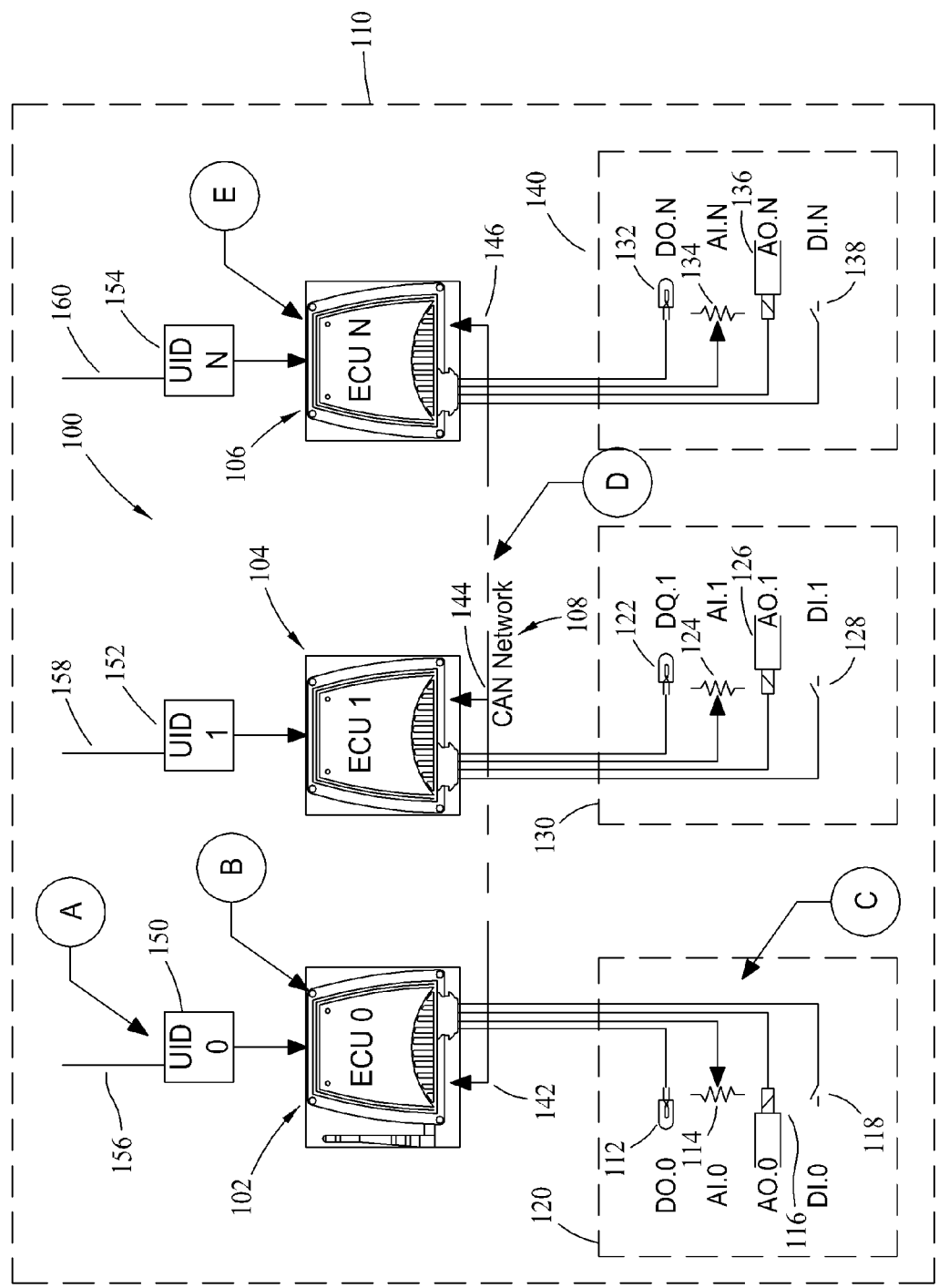
FIG. 1 is a simplified schematic representation of an exemplary control system network including a number of interconnected control devices and embedded identification and configuration keys for the control devices.

Exemplary embodiments of control systems and methods are disclosed that overcome numerous disadvantages in the art. In order to understand the inventive concepts to their fullest extent, the following description will be segmented into different sections or parts, wherein Part I describes difficulties of existing plug and play technology in certain applications, and Part II describes exemplary systems and methods overcoming the difficulties described in Part I.

I. Introduction to the Invention

As noted above, detecting incompatible hardware and software between interconnected devices on a network can sometimes be difficult. If hardware and software compatibility issues exist, an inoperable combination of devices may result. While this result can be frustrating to users, this condition is usually self-evident. That is, users are likely to quickly realize that the devices are not operating properly and corrective actions can be promptly taken.

A more troubling scenario is when incompatible hardware and software issues exist between connected devices, but are not necessarily evident to the end user or operator of a system including the devices. In such a case, the system and/or the interconnected devices may appear to be communicating and properly operating when in actuality they are not. As such, sub-optimal operation of the networked devices may result, without the end user realizing it. In some applications the implications of this may be undesirable yet relatively minor, while in other applications the consequences can be significant.

One application, but not the only application, wherein significant consequences may result from incompatibility between networked hardware and software devices involves electronic control systems. Electronic control systems are widely used, for example, in open and closed loop feedback control systems in a variety of applications, such as the monitoring and operation of machines, equipment, industrial processes, and vehicles of various types.

Proper operation of a control system for these exemplary applications may be impaired by incompatible hardware devices and/or software compatibility issues stemming from interconnected control devices defining the control system in whole or in part. Open and closed loop feedback controls may not operate properly in such circumstances and may result in sub-optimal operation of the associated machine or equipment. Among other things, undesirable performance issues may result, together with economic loss due to lost productivity or potential damage to components associated with the control system, and even potentially hazardous operating conditions.

Modern vehicles are now controlled by rather sophisticated electronic control systems having a number of Electronic Control Units (ECUs) connected to one another through a network protocol, such as a Controller Area Network (CAN). In such vehicle networks each ECU in the system performs one or more specific tasks to monitor or control a sub-system of the vehicle and certain components or operational aspects thereof The tasks performed by the ECUs depend on the proper placement and type of ECU, as well as the proper placement and type of the connected vehicle components for each ECU. In order for the ECUs to perform the necessary tasks, each ECU in the network must be configured and the proper application software must be loaded into each ECU.

ECUs in a given network are typically programmed on a per application basis by the Original Equipment Manufacturer (OEM) to ensure proper communication between the ECUs and operation of the vehicle. Toward that end, each ECU in the network is typically is assigned a hardware identifier indicating its place and position in the vehicle, sometimes referred to as a node. The hardware identifier provides a basis for installing the appropriate software for each ECU. Conventionally, node identifiers could be manually assigned to ECUs with wire jumpers or dip switches, and the networked ECUs are pre-programmed with special tooling including a PC, cabling, and a special software application. Of course, it is possible to mistakenly provide an incorrect hardware identifier for any given ECU, or node identifiers for the ECUs. In increasingly sophisticated control systems having a large number of ECUs and nodes, such mistakes are perhaps more likely than before and more difficult to detect if they occur. For example, a modern automobile may include a control systems having ten or more ECUs as original equipment. Effectively managing such a high number of ECUs presents practical concerns and challenges for original equipment manufacturers.

Repair and maintenance procedures provide additional opportunities for one or more of the ECUs to be incorrectly installed, or for an existing ECU to be replaced with an incompatible ECU, either from a hardware or software perspective, at a later point in time. For example, vehicle maintenance or repair procedures present opportunities for persons to unknowingly connect an incompatible ECU, either from a hardware or software perspective, to the network. As noted above, the consequences of this may not be immediately apparent to a technician, but may cause long term issues in operation of the vehicle. Other opportunities to present incompatible ECUs may be presented in instances of vehicle modification to add accessories or other optional features and equipment not directly provided by the vehicle manufacturer.

Because of the proliferation of ECUs in vehicles and other systems, they have, to some extent, become plug and play devices. Vehicle subsystems may be provided by different manufacturers for later integration in a vehicle either at an OEM level or an aftermarket level. As the number of ECUs in each vehicle increases, so does the possibility of mismatched or incompatible ECUs. In the case of some vehicle subsystems, such as engine controls, the networks are often "headless" and provide little if any feedback to a human person in operation. Opportunities for humans to detect hardware and software incompatibilities introduced by ECUs in headless systems are dramatically diminished. While technicians may take great care to ensure that a replacement or newly introduced ECU is of the correct type, is correctly programmed, and is properly identified on the network, mistakes may nonetheless occur, leading to the consequences discussed above.

At least in part to address human error in installing the ECUs, the use of so-called generic ECUs has been proposed for use in generic control networks. In one proposed generic network of this type, a fully operational application may be stored in each of the modules in the network. The fully operational application includes executable instructions for every ECU in the network. Each ECU broadcasts a signal over the network so that its configuration may be determined on power up. When a replacement ECU is installed, the replacement ECU maybe detected via such a signal and, if it does not already include the appropriate software, the replacement ECU may download the applicable software instructions from any of the existing ECUs in the network. Such systems are perhaps beneficial in that technicians need not concern themselves with specific programming of an individual ECU.

When using such generic ECU's, however, the position, location, or node of the replacement ECU in the network still must be correctly identified, as the operation of the replacement ECU is position dependent in the networked system. That is, while all the generic ECU's include a fully operational application, different ECU's in the network execute different portions of the application. The portion of the software to be executed by any given replacement ECU is dependent on where the replacement ECU is installed in the network. Properly identifying the position, location, or node of the replacement ECU to the network, and selecting appropriate inputs to identify the position, location, or node of the replacement ECU in networks including a number of possible ECU positions, locations, or nodes is sometimes easier said than done. Human error may therefore still result during maintenance, repair, and modification of networked systems including generic ECU's.

II. Exemplary Embodiments of Inventive Systems and Methods

Exemplary networks, systems and methods are described below for electronic control systems that largely, if not completely, avoid or mitigate potential human error in installing and servicing networks of interconnected control devices. The system and methods include unique identification and configuration keys, embedded in the network at specific locations. The keys facilitate automatic identification of specific locations, nodes or positions of connected hardware devices such as electronic control units (ECU's) in a larger control network. The identification keys embedded in the network also facilitate automatic device configuration for control devices as they are connected to the network, and automatic software updates for newly discovered devices to ensure software compatibility and system functions associated with the position of the device in the network, such as vehicle functions corresponding to the ECU positions.

FIG. 1 is a simplified schematic representation of a control network 100 including a number of interconnected control devices, such as electronic control units (ECUs) 102, 104, 106 in an illustrative example. ECUs are also sometimes referred to as "control units" or "control modules". The ECUs in an exemplary embodiments are programmable processor-based devices including a memory storage wherein instructions and data may be stored. In other embodiments, the control devices may include other types of control devices more broadly referred to as controllers, microcontrollers or other processor-based devices used in a variety of non-vehicular controls and systems.

In one embodiment, the ECU 102 is a master or manager ECU, and the ECUs 104 and 106 are slave devices in a distributed control system familiar to those in the art. Other arrangements of control devices are possible, however, in other embodiments, and in one embodiment any of the ECUs 102, 104, and 106 is capable of acting as master or slave. Also, while three ECUs 102, 104, and 106 are shown for purposes of discussion, it is recognized that greater or fewer numbers of ECUs may likewise be utilized, and in a typical application many more than three ECUs would typically be present. That is, the network 100 may include ECUs numbered 1 through N, where N is variable. Typically, the number N rises the sophistication of the network 100 and/or the underlying controlled system (e.g., a vehicle) increases. The only practical limits on the ultimate number N of interconnected control devices in the network 100 are the memory or storage capacity of the control devices to include the necessary application instructions for all control devices on the network 100, and network communication performance issues as increasing numbers of control devices are added. The network 100 is also expandable such that additional ECUs may be introduced at a point in time after its original construction. As such the number N of control devices in the network 100 may change over time.

While the benefits of the inventive systems and methods described herein are believed to increase as the number N of ECUs in the network 100 increases (as mentioned previously a modern vehicle may include about 80 ECUs or more as original equipment), the systems and methods can be effectively implemented in an embodiment having as few as two control devices. Additionally, the ECUs 102, 104, and 106 are removable from and replaceable in the network 100 as needed or as desired. In an exemplary embodiment, as the network 100 is initially constructed, the ECUs are originally provided as substantially identical hardware devices having the same the same software and data structure, such that the ECUs 102, 104, and 106 may be generally interchanged with one another. If, however, one or more of the originally provided ECUs is hardware or software incompatible, the incompatibility may be detected as explained further below.

The ECUs 102, 104, 106 may be interconnected via a communication bus 108 in an exemplary embodiment as shown, although in other embodiments other communication links known in the art may be utilized. The ECUs 102, 104, 106 may communicate according to a network communication protocol, such as a known Controller Area Network (CAN), or other communication protocols known in the art may alternatively be utilized to allow the ECUs 102, 104, 106 to communicate. In the exemplary control network 100 shown, each ECU 102, 104, 106 performs specific tasks associated with specific components. The specific tasks performed by each ECU 102, 104, 106 are typically different from one another, and the tasks performed by each ECU 102, 104, 106 depends on the physical position of the respective ECUs 102, 104, 106 in the network, the type of components connected to each ECU, and the functions to be controlled by each ECU. In order for ECUs 102, 104, 106 to perform their respective tasks, each of the ECUs 102, 104, 106 must be configured and the appropriate application software must be loaded into each of the ECUs 102, 104, 106.

In an exemplary embodiment, the ECUs 102, 104, and 106 are provided to monitor and control aspects of a vehicle 110 (shown in phantom in FIG. 1). The vehicle 110 may in various exemplary embodiments be a passenger vehicle (e.g., motorcycles, cars, trucks and buses designed for road use), a commercial vehicle (e.g., tractor trailers, mail trucks, delivery vehicles, garbage trucks and haulers, forklifts), construction vehicles (e.g., diggers, backhoes, bulldozers, loaders, and earthmoving equipment, graders, rollers, dump-trucks), vehicles of all types equipped for military use, vehicles designed for off-road use (e.g., tractors and other farm vehicles, four wheel drive vehicles, sport utility vehicles, all terrain vehicles, dirt bikes, dune buggies, rock crawlers, sandrails, snowmobiles, golf carts), various types of marine vehicles (e.g., ships, boats, submarines, personal watercraft and other vessels), various types of aircraft (e.g., planes and helicopters), space vehicles (e.g., missiles, rockets, satellites and shuttles), recreational vehicles (e.g., RVs and camper trailers), or other modes of transporting persons or things that are propelled and/or powered by mechanical, electrical and other systems and subsystems.

Further, exemplary vehicles including the control network 100 may be manned (i.e., operated or controlled at least in part with human participation or direction on board the vehicle), unmanned (i.e., operated or controlled without human participation), or combinations of both. The network 100 and the ECUs 102, 104, and 106 are typically embedded or integrated into the structure of the vehicle itself and are carried on board the vehicle, although it is possible that a portion of the control network 100 could be remotely located from the vehicle.

While the network 100 is believed to be particularly advantageous for vehicle control systems, it is believed to provide similar benefits to non-vehicular control systems as well. As such, similar networks could be provided to monitor and control a variety of machines and industrial equipment for a host of purposes, as well as to monitor and control industrial processes of all kinds As such, the vehicle environment and application discussed herein is set forth for purposes of illustration rather than limitation, and the inventive concepts disclosed herein are not limited to any particular application except where specifically defined as such in the claims.

Each ECU 102, 104, and 106 has a number input/output deices (I/O devices) connected to it which are used to control various functions of the vehicle 110 in an exemplary embodiment. In the example shown, the ECU 102 is connected to I/O devices such as an indicator light 112, a solenoid 114, an electronically controlled fluid valve 116, a switch 118 collectively representing a first subsystem 120 of the vehicle 100. The ECU 104 is connected to I/O devices such as an indicator light 122, a solenoid 124, an electronically controlled fluid valve 126, and a switch 128 collectively representing a second subsystem 130 of the vehicle 100. The ECU 106 is connected to I/O devices such an indicator light 132, a solenoid 134, an electronically controlled fluid valve 136, and a switch 138 collectively representing a third subsystem 140 of the vehicle 100. The subsystems 120, 130, 140 while including similar I/O devices in the illustrated embodiment are independently operable and may represent different functions. For example, the indicator lights 112, 122 and 132 in the respective subsystems may be illuminated for different reasons. Likewise, the solenoids 114, 124, and 134 may be operated for utilized for different purposes. The fluid valves 116, 126 and 138 may involve different fluids, and the switches 118, 128 and 138 may provide power to different circuits. The operation of the connected I/O devices in each subsystem 120, 130, 140 (or response thereof by the ECUs 102, 104 and 106) depends on the configuration of each ECU 102, 104 and 106 and the software loaded into each ECU 102, 104 and 106. In a vehicle environment, many of the ECUs would typically be operated with closed loop feedback from the connected components, although open loop control arrangements are possible While some exemplary I/O devices are illustrated for the subsystems 120, 130 and 140 it is recognized that a variety of other known I/O devices are known and may be utilized in combination with or in lieu of those shown, including but not limited to sensors and transducers of various types indicating acceleration, velocity, speed, temperature, pressure, voltage, and other aspects of the vehicle and its subsystem components in use. Some of the control devices may be connected to one another through digital communication interfaces such as Controller Area Network (CAN) technology, Local Interconnect Network (LIN) technology, 1-Wire® technology, and other known interfaces. Additionally, operator inputs such as throttle, braking and steering inputs may be communicated to one or more of the ECUs.

While three subsystems 120, 130, and 140 are shown, it is understood that additional subsystems are typically utilized in a modern vehicle. Typical subsystems for an automobile may include, for example, an engine control subsystem, a transmission control subsystem, a powertrain control subsystem, an antilock brake system (ABS) subsystem, an airbag control subsystem, a communication control subsystem, a man machine interface subsystem, a body control subsystem (including door locks, electric windows, courtesy lights etc.), door control subsystems, seat control subsystems, climate control subsystems, speed control subsystems, tire pressure monitoring subsystems, convenience control subsystems and entertainment subsystems.

Other vehicles may include still other subsystems in combination with or in lieu of those mentioned above dependent on the necessary features of the vehicle and its end purpose. Some examples of other systems include, but are not limited, lift features for commercial trucks and tractor trailers, boom control subsystems for utility trucks and fire trucks, refrigeration systems for trailers, and electromechanical subsystems for special purpose vehicles and equipment, including but not limited to construction and farm vehicles, snow plow equipment, lawn and garden equipment, etc. Aftermarket accessories and subsystems requiring ECUs are also available for a wide variety of different types of vehicles such that vehicles may be customized and adapted for other purposes. The number and type of subsystems available for use in any given implementation is practically unlimited.

Continuing with the vehicle system example, the vehicle manufacturer typically loads the appropriate software application into the ECUs 102, 104 and 106 and connects the ECUs 102, 104 and 106 to the appropriate positions or nodes 142, 144, 146 in the network 100. Each node 142, 144, 146 represents a specific position or location in the vehicle and in the network proximate where the respective components reside for the vehicle subsystems 120, 130 and 140. Once the ECU configurations and software is tested for proper operation, the vehicle 100 may be delivered to an end user. As previously mentioned, the operation of each ECU 102, 104 and 106 is position dependent in the network. That is, the inputs, outputs and software portions executed by the ECUs 102, 104 and 106 varies with the particular subsystems associated with each ECU, and is typically different among the ECUs provided in the network 100.

In conventional networks of this type, if any of the ECUs 102, 104 and 106 fails after original installation, it must be replaced with a compatible hardware device (i.e., another ECU of the same or compatible configuration in the vehicle example being discussed) and the proper software must be loaded into the replacement hardware device, either on site during the maintenance activity or by the manufacturer of the replacement hardware device before provided to the maintenance facility. As previously explained, this introduces the possibility for numerous errors to be made, including but not limited to selecting an ECU that is incompatible from a hardware perspective, selecting an ECU having incompatible software, and misidentifying the connection node or location for an otherwise compatible ECU. All of these scenarios are undesirable for the reasons explained above and are preferably avoided.

To address human error and installation issues in properly installing and servicing the network 100, each ECU 102, 104, 106 is provided with a unique identification key 150, 152, 154 that allows for automatic detection of where any ECU, either originally provided or a replacement ECU, is connected in the network 100. The identification keys 150, 152, 154 ensures automatic device configuration for replacement ECUs and facilitates software updates to the ECUs to ensure optimal operation of the vehicle over time. The identification key 150, 152 is denoted by the prefix UID in the FIG. 1 for each of the ECUs 1 through N in any given implementation, and is used to store information about the position and configuration of each respective ECU in the vehicle.

In an exemplary embodiment, the identification keys 150, 152, 154 are simple and robust electronic hardware devices installed in a wiring harness 156, 158 and 160 associated with each ECU 102, 104, 106. By coupling the identification keys 150, 152, 154 to the wiring harnesses, the identification keys 150, 152, 154 remain in place and are embedded in the network 100 even when the ECUs are removed. In one embodiment, the wiring harnesses may 156, 158 and 160 may define a portion of the communication bus 108 for the ECUs 102, 104, 106. In another embodiment, the wiring harnesses 156, 158 and 160 may be associated with one or more of the inputs to the ECUs 102, 104, 106 for the components in the respective subsystems 120, 130, 140 associated with the ECUs 102, 104 and 106. In still other embodiments, the identification keys 150, 152, 154 could be installed in an embedded location in the network apart from the wiring harnesses 156, 158 and 160 while serving similar purposes.

The identification keys 150, 152, 154 may be digital semiconductor, chip devices such as 1-Wire® integrated circuit device of Dallas Semiconductor that may be used to store information. Alternatively, other known data storage and identification elements may be utilized, including but not limited to Electrically Erasable Read-Only Programmable Memory (EEPROM devices). The identification keys 150, 152, 154 may be installed in connector elements of the wiring harnesses to establish plug-type connections with the respective ECUs 102, 104, 106. The installation of the identification key 150, 152, 154 in a more or less permanent, embedded location in the network 100, such as in the wiring harnesses 156, 158, and 160, ensures that the position of each ECU in the vehicle is uniquely identifiable by the ECUs as they are installed. By locating the identification key 150, 152, 154 in a fixed and practically permanent location in the network, the locations/positions/nodes may be automatically detected by respective the ECUs as they are installed. Service and repair technicians need not identify manually identify the locations/positions/nodes at all as the ECUs are replaced, and opportunities for mistakes and error in identifying the nodes are eliminated.

In an exemplary embodiment, each of the identification keys 150, 152, 154 uniquely identifies the position of each node 142, 144, 146 in the network where each ECU is connected with a serial number that cannot be repeated. For example, a 64-bit ID serial number can be used to uniquely identify every node across a large number of networks and vehicles.

Configuration data may also be stored in the identification keys 150, 152, 154 for each node/location/position in the vehicle network 100. The configuration data may include network communication parameters such as a network identifier, baud rate, and other information.

To ensure hardware compatibility, a minimum compatible hardware version for each position/location/node in the network 100 may be stored in the identification keys 150, 152, 154.

To ensure software compatibility, a minimum compatible software version for the position/location/node in the network 100 may be stored in the identification keys 150, 152, 154.

Of still further benefit, a cyclic redundancy value may be stored in the identification keys 150, 152, 154 to determine if data corruption has occurred.

The embedded identification keys 150, 152, and 154 in one embodiment may be provided by the vehicle manufacturer with the appropriate information. In another embodiment, an existing vehicle may be retrofitted with the embedded identification elements in whole in part if the appropriate configuration information is known, made available, or could be determined.

Figure 2:
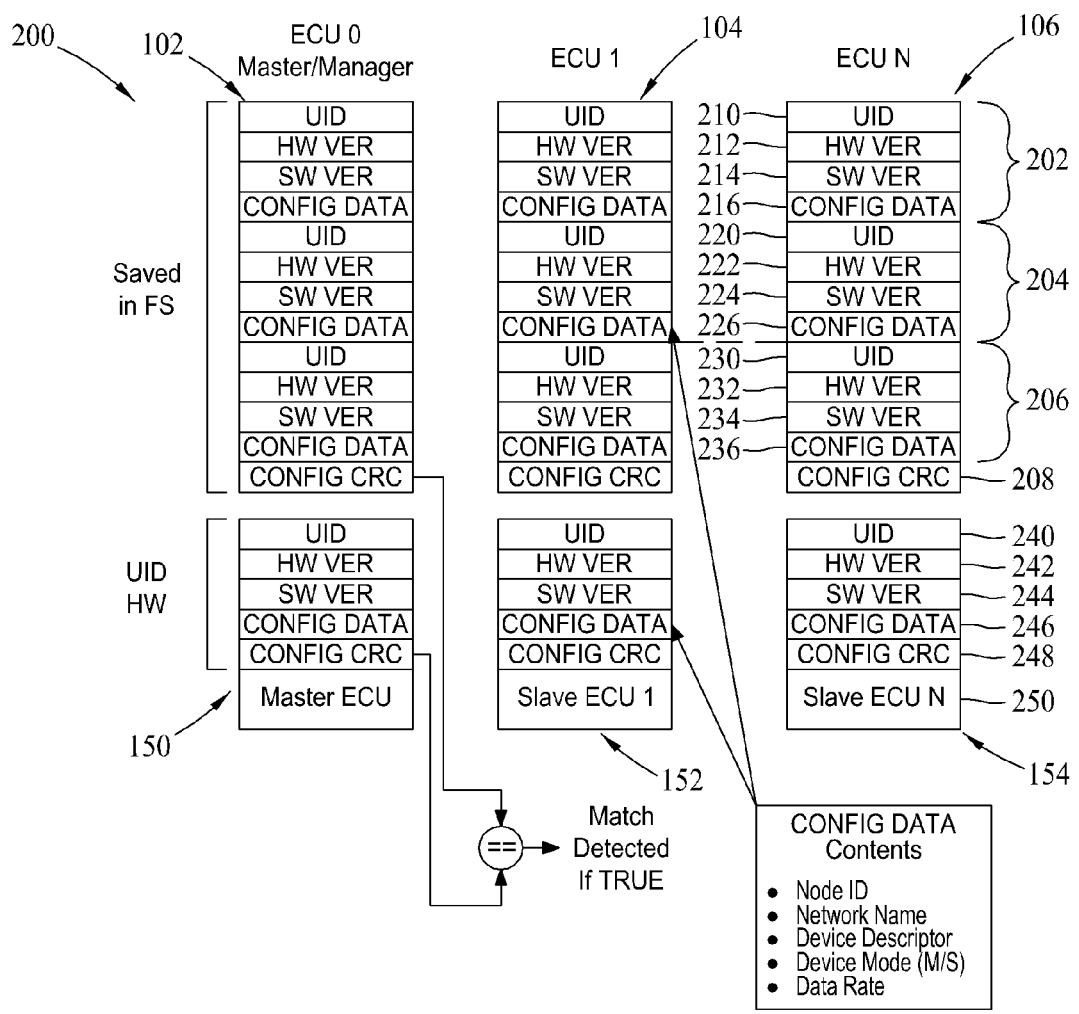
FIG. 2 illustrates an exemplary data for the control devices and keys shown in FIG. 1.

FIG. 2 illustrates an exemplary data structure 200 for the hardware devices in the network 100 shown in FIG. 1. More specifically, FIG. 2 shows a data-centric view of the information stored in the ECUs 102, 104 and 106 and each respective identification key 150, 152 and 154. Each ECU 102, 104 and 106 maintains a data structure in memory and each identification key 150, 152, 154 includes a corresponding data structure. The data structures of the ECUs and the identification keys 150, 152 and 154 allow a position dependent configuration of each identification element to be compared with the saved internal data structure in the corresponding ECU. By providing such data structure in the file system of each ECU 102, 104 and 106, each ECU on start-up can determine if a correct match between the data stored in the corresponding identification key matches the respective ECUs as explained below.

In the exemplary embodiment shown in FIG. 2, each of the ECUs 102, 104 and 106 includes the same data structure such that the ECUs 102, 104 and 106 are generally interchangeable with one another and capable of functioning at multiple positions/locations/nodes in the network 100 described above. As the data structures are the same for each ECU 102, 104 and 106, the data structure for one of the ECUs, namely the ECU 106, will now be described below on the understanding that the ECUs 102 and 104 have a similar date structure.

The data structure ECU 106 may have, as shown in FIG. 2, substructures including a first configuration substructure 202, a second configuration substructure 204, a third configuration substructure 206, and a configuration CRC 208.

The first configuration substructure 202 includes identification key data 210, hardware version data 212, software version data 214 which may include a boot loader, and configuration data 216. The configuration data 216 may include node identification data, network name data, device descriptor data, device mode data, and data rate information for network communication purposes. The configuration data may also include the necessary code, algorithms, data and information such that the ECU 106 may effectively monitor and control the first vehicle subsystem 120 shown in FIG. 1 if connected thereto. Alternatively, the code and algorithms, data and information may be stored elsewhere in the ECU, with the configuration data 216 providing a basis to call and execute appropriate portions of the code to monitor and control the first vehicle subsystem 120.

The second configuration substructure 204 includes identification key data 220, hardware version data 222, software version data 224, and configuration data 226. The configuration data 226 allows the ECU 106 to effectively monitor and control the second vehicle subsystem 130 shown in FIG. 1 if connected thereto.

The third configuration substructure 206 includes identification key data 230, hardware version data 232, software version data 234, and configuration data 236. The configuration data 236 allows the ECU 106 to effectively monitor and control the third vehicle subsystem 140 shown in FIG. 1 if connected thereto.

The configuration CRC 208 is a code generated for the entire data structure stored in the file system of the ECU 106, including the first, second and third configuration substructures 202, 204, 208. While three configuration substructures 202, 204, and 206 are shown that correspond to each of the three ECU positions shown in FIG. 1, it is understood that greater or fewer configuration substructures would typically be provided to match the number N of the control devices actually utilized.

The data structure for the identification keys 150, 152 and 154 in an exemplary embodiment is also the same in each key in an exemplary embodiment. In the example, shown, the data structure for the identification key 154 includes identification key data 240, hardware version data 242, software version data 244, configuration data 246, a configuration CRC 248 and ECU master/slave data 250.

The hardware version data 242, software version data 244, configuration data 246 in each respective identification key 150, 152, 154 corresponds to one of the configuration substructures 202, 204, 206 in the respective ECUs 102, 104, and 106. That is, when data in the identification keys 150, 152, 154 is read by the ECUs 102, 104 and 106, the respective ECUs may determine which of the configuration substructures 202, 204, 206 applies at the point of connection. Alternatively stated, once the information stored in an identification key is received by an ECU, the ECU can determine its specific location in the network and configure itself to run the appropriate algorithms for the particular subsystem in control network 100 to which it has been connected. As such, each ECU is capable of being installed at multiple locations/positions/nodes in the network, and automatically detecting its point of connection and configuration itself for operation once connected. From an installation perspective, and also from the perspective of a service technician, specific knowledge of the control network 100 and any need to distinguish between the connection positions/locations/nodes at the time of connection of the ECUs is unnecessary to install or service the ECUs in the network. Mistakes associated with identifying position/location/node are therefore avoided.

Additionally, the data structures in the ECUs 102, 104 and 106 and the identification keys 150, 152 and 154 may be utilized to ensure hardware and software compatibility of ECUs in the network by comparing one or more aspects of the data structures in the ECUs and corresponding identification keys.

Figure 3:
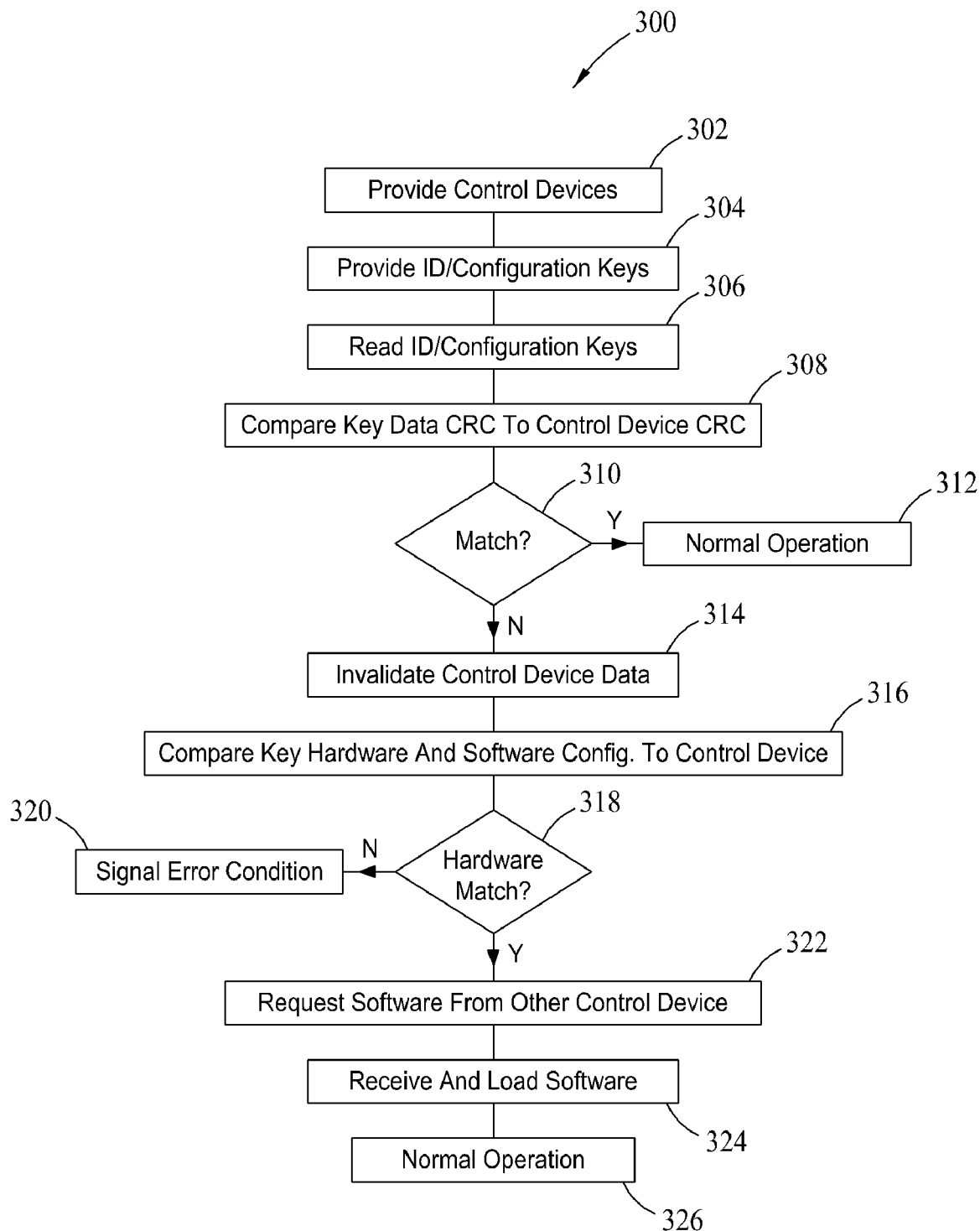
FIG. 3 is an exemplary method flowchart of exemplary processes utilized in the system shown in FIG. 1 with the data structure shown in FIG. 2.

FIG. 3 is an exemplary method flowchart of exemplary processes 300 utilized by the control devices shown in FIG. 1 with the data structure shown in FIG. 2. In preliminary steps 302 and 304, the ECUs and identification keys are provided.

At step 306, each ECU reads the information stored in the corresponding identification key. At step 308 each ECU 102, 104 and 106 compares a parameter of the key to the ECU, such as the configuration CRC. That is, in one embodiment each ECU compares the configuration CRC saved in the respective ECU file system to the configuration CRC saved in the respective identification key 150, 152, and 154 (FIG. 2) to determine whether the ECU is compatible with its own position in the network and/or compatible with other ECUs connected to the network 100.

At step 310, if the configuration CRC in the identification key matches the CRC stored in the ECU file system, then the ECU will enter a normal operation mode at step 312 and begin executing the appropriate software loaded on the ECU. The node ID from the key tells the ECU where it has been connected for execution of the appropriate portions of the software application loaded on the ECU to operate, monitor and control one of the component subsystems. Additionally, the node ID is utilized by the ECU to generate network messages including packet identifiers in the proper protocol that can be received and understood by other connected devices.

If the configuration CRC in the identification key does not match the CRC stored in the ECU file system at stop 310, the ECU will invalidate it's internally saved data structure at step 314. At step 316 the ECU will then compare the hardware version data 242 (FIG. 2) and software minimum boot loader version data 244 (FIG. 2) of the identification key to the hardware version data 212 and the software version data 214 stored in the ECU file system. If neither the hardware version data 242, 212 or the software version data 244, 214 match at step 318 the ECU will fail to enter operational mode and signal a hardware/boot-loader mismatch error for that position on the network as shown at step 320. The error condition indicates an incompatible ECU devices has been installed. Various types of error signals may be generated, and the error signals may include information concerning the type of error detected (i.e., software or hardware incompatibility information) such that problems may be promptly acknowledged and addressed to be addressed before the vehicle can be started. That is, the vehicle remains in a safe, stop condition until control network issues may be resolved.

If either the hardware version data 242, 212 and/or the software minimum boot loader version 244, 214 do match at step 318, then the ECU at step 322 sends a request for one of the other ECUs connected to the network to send it the correct software application file and configuration. Once received, the ECU loads the correct software application file and configuration data into the data structure at step 324 and enters the normal operation mode at step 326.

As long as at least one ECU is present on the network having a valid configuration and the proper software, replacement ECUs may be installed and may be self-configuring with the proper software as long as they are hardware compatible. This is because the file system in each ECU on the network contains the application software for its own ECU and all the other ECUs on the network. When software mismatches are detected for newly introduced ECUs, the ECU with the master configuration will re-distribute the configuration and software application to ECUs with invalid configurations. If there is no master present, then the ECU with the highest node ID which contains a valid configuration will assume temporary master/manager (flying-master) functionality and distribute the software and configuration update.

While exemplary processes are described, it is understood that many variations of the basis methodology described above may employed with equal effect. For example, a parameter other than a CRC value may be utilized to determine a match or mismatch between an ECU and an identification key. Likewise, comparisons of parameters other than hardware versions and software boot loader versions may be made to signal error conditions. As still another example, an ECU may obtain necessary data to operate from the corresponding key, as opposed to another ECU, for configuration purposes.

The benefits of the systems and methods described above are numerous. Cost reduction is made possible by simplifying installation and service issues for the control networks. Hardware and software incompatibility issues may be timely detected and resolved. Controlled devices such as vehicles including the control networks may operate with increased safety at optimal performance levels and potentially over a longer life span. The control devices can be installed and replaced without detailed foreknowledge of the system configuration, thereby eliminating human errors and undesirable effects.

An exemplary embodiment of a control system network has been disclosed including: a communication link; a plurality of interchangeable and replaceable control devices each connected to the communication link and operatively connectable to at least one input/output device of a controlled system; and an identification key associated with each respective control device, each identification key including configuration data corresponding to the respective control device, each identification key being electronically readable by one of the control devices when introduced to the network.

Optionally, the interconnected devices are electronic control units. Each of the electronic control units may be associated with a respective subsystem of input/output devices of the controlled system. Each of the electronic control units may be configured to operate each of the respective subsystems. The communication link may include a bus. The identification key may be embedded in the network at a fixed location. The control system may include at least one wiring harness, and at least one of the identification keys is integrated with the wiring harness. Each of the interconnected devices may perform at least one specific task, with the specific task being dependent on a connection location in the control system.

Also optionally, each identification key may include a first data structure including configuration data and information, and each control device including a second data structure may include data and information stored in the control device, with each control device configured to compare information from the first data structure to information in the second data structure to evaluate a compatibility of the control device with the network. The first data structure may include a first cyclic redundancy check code (CRC) and the second data structure may include a second cyclic redundancy check (CRC) code, with each control device configured to compare the first CRC to the second CRC to determine a compatibility of the control device when introduced to the network. The first and second data structures may include configuration data for the control devices, and if information from the first data structure does not match information in the second data structure when a control device is introduced to the network, the control device may be configured to invalidate the information in the second data structure and request correct configuration data and software from another of the control devices on the network. If information from the first data structure matches information in the second data structure when a control device is introduced to the network, the control device may be configured to enter a normal operation mode.

An exemplary method of detecting compatibility of an introduced control device in a control system network has also been disclosed. The introduced control device has first configuration data stored therein, and the method includes: providing an identification key at an embedded location in the network, the identification key including second configuration data for a control device introduced control device at the embedded location; reading the second configuration data from the identification key with the introduced control device; the introduced control device comparing a first parameter from the first configuration data with at least a second parameter from the second configuration data; and if the first parameter from the first configuration data matches the second parameter from the second configuration data, the introduced control device entering a normal operation mode.

Optionally, comparing a first parameter from the first configuration data with at least a second parameter from the second configuration data includes comparing a first cyclic redundancy check (CRC) value from the first configuration data with a second cyclic redundancy check (CRC) value from the second configuration data If the first parameter from the first configuration data does not match the second parameter from the second configuration data, the introduced control device may compare hardware and software parameters from the first configuration data to hardware and software parameters from the second configuration data. If one of the hardware and software parameters from the first configuration data matches one of the hardware and software parameters from the second configuration data, the introduced control device invalidates data stored thereon.

Also optionally, the method may include the introduced control device requesting software from another control device on the network, and the introduced control device entering a normal operation mode. In the normal operation mode the control device may function to control a subsystem of a vehicle.

If none of the hardware and software parameters from the first configuration data matches the hardware and software parameters from the second configuration data, the introduced control device optionally enters an error mode.

Providing an identification key at an embedded location in the network may optionally include attaching the identification key to a wiring harness.

The introduced control device may include application software, and the method may optionally include the introduced control device executing a portion of the software corresponding to its installed location in the network. The network may includes a plurality of connection nodes, with the introduced control device operable at each of the plurality of nodes, and the method also including the introduced control device determining a respective one of the nodes to which the control device has been connected based upon the second configuration data from the identification key.

An exemplary control system has also been disclosed including: a plurality of interchangeable and replaceable control devices operatively connectable to at least one input/output device of a controlled subsystem at a connection node; and a communication link facilitating communication between at least two of the plurality of control devices. A plurality of identification keys are each associated with a respective one of the control devices. Each identification key includes configuration data for one of the connection nodes, and each identification key is electronically readable by one of the control devices when introduced to the network. Each of the plurality of control devices determines, based on a reading of the associated identification key, hardware and software compatibility with the network, and if determined to be compatible, each of the control devices determines the connection node where it has been installed, and executes position dependent software routines for controlling the subsystem associated with the node where it has been installed.

Optionally, the controlled subsystem may include a vehicle subsystem, and the plurality of control devices may comprise electronic control units (ECUs). Each of the ECUs may be self configuring with current application software for the connection node where it has been installed. The identification keys may be embedded in fixed locations proximate the connection nodes. The identification keys may be attached to wiring harnesses. Each ECU may include a data structure having multiple sections, and each of the identification keys may include a data structure corresponding to one of the sections of each ECU.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A control system network comprising:
   a communication link;
   a plurality of interchangeable and replaceable control devices each connected to the communication link and operatively connectable to at least one input/output device of a controlled system; and
   an identification key associated with each respective control device, each identification key including configuration data corresponding to the respective control device, each identification key being electronically readable by one of the control devices when introduced to the network;
   wherein each identification key includes a first data structure including configuration data and information, each control device including a second data structure including data and information stored in the control device, each control device configured to compare information from the first data structure to information in the second data structure to evaluate a compatibility of the control device with the network; and
   wherein if information from the first data structure does not match information in the second data structure when a control device is introduced to the network, the control device is configured to invalidate the information in the second data structure and request correct configuration data and software from another of the control devices on the network.

2. The control system network of claim 1, wherein the plurality of interchangeable and replaceable control devices are electronic control units.

3. The control system network of claim 2, wherein each of the electronic control units is associated with a respective subsystem of input/output devices of the controlled system.

4. The control system network of claim 3, wherein each of the electronic control units is configured to operate all of the respective subsystems of the controlled system.

5. The control system network of claim 1, wherein the communication link comprises a bus.

6. The control system network of claim 1, wherein each identification key is embedded in the network at a fixed location.

7. The control system network of claim 6, wherein the control system includes at least one wiring harness, and at least one of the identification keys is integrated with the wiring harness.

8. The control system network of claim 1, wherein each of the interconnected devices performs at least one specific task, the specific task being dependent on a connection location in the control system.

9. The control system network of claim 1, wherein the first data structure includes a first cyclic redundancy check code (CRC) and the second data structure includes a second cyclic redundancy check (CRC) code, each control device configured to compare the first CRC to the second CRC to determine a compatibility of the control device when introduced to the network.

10. The control system network of claim 1, wherein the first and second data structure includes configuration data for the control devices.

11. The control system network of claim 1, wherein if information from the first data structure matches information in the second data structure when a control device is introduced to the network, the control device is configured to enter a normal operation mode.

12. The control system network of claim 1, wherein each identification key is separately supplied from each respective control device.

13. A method of detecting compatibility of an introduced control device in a control system network including a plurality of connection nodes and the introduced control device operable at each of the plurality of connection nodes, the introduced control device having first configuration data stored therein, the method comprising:
   providing an identification key at an embedded location in the network, the identification key including second configuration data for the introduced control device at the embedded location;
   reading the second configuration data from the identification key with the introduced control device;

determining, with the introduced control device, a respective one of the nodes to which the control device has been connected based upon the second configuration data from the identification key;

the introduced control device comparing a first parameter from the first configuration data with at least a second parameter from the second configuration data; and if the first parameter from the first configuration data matches the second parameter from the second configuration data, the introduced control device entering a normal operation mode.

14. The method of claim 13, wherein comparing a first parameter from the first configuration data with at least a second parameter from the second configuration data comprises comparing a first cyclic redundancy check (CRC) value from the first configuration data with a second cyclic redundancy check (CRC) value from the second configuration data.

15. The method of claim 13, further comprising:
comparing, with the introduced control device, hardware and software parameters from the first configuration data to hardware and software parameters from the second configuration data if the first parameter from the first configuration data does not match the second parameter from the second configuration data.

16. The method of claim 15, wherein if one of the hardware and software parameters from the first configuration data matches one of the hardware and software parameters from the second configuration data, the introduced control device invalidating data stored thereon.

17. The method of claim 16, further comprising:
the introduced control device requesting software from another control device on the network.

18. The method of claim 17, further comprising:
the introduced control device entering a normal operation mode.

19. The method of claim 15, further comprising:
if none of the hardware and software parameters from the first configuration data matches the hardware and software parameters from the second configuration data, the introduced control device enters an error mode.

20. The method of claim 13, wherein providing an identification key at an embedded location in the network comprises attaching the identification key to a wiring harness.

21. The method of claim 13, wherein in the normal operation mode the control device functions to control a subsystem of a vehicle.

22. The method of claim 13, wherein the introduced control device includes application software, and the introduced control device executing a portion of the software corresponding to its installed location in the network.

23. A control system comprising:
a plurality of interchangeable and replaceable control devices each operatively connectable to at least one input/output device of a controlled subsystem at one of a plurality of connection nodes, the control devices configured to operate at all of the plurality of connection nodes via different software routines corresponding to at least some of the connected nodes;
a communication link facilitating communication between at least two of the plurality of control devices; and
a plurality of identification keys each associated with a respective one of the control devices, each identification key including configuration data for a respective one of the plurality of connection nodes, and one of the identification keys being electronically readable by each of the control devices when introduced to the network;
wherein each of the plurality of control devices is configured to determine, based on a reading of the associated identification key, hardware and software compatibility with the network, and
if determined to be compatible, each of the control devices further configured to:
determine a respective one of the plurality of connection nodes to which the control device has been connected, and
execute applicable software routines corresponding to the node where the control device has been connected.

24. The system of claim 23, wherein the controlled subsystem comprises a vehicle subsystem, and the plurality of interchangeable and replaceable control devices comprise electronic control units (ECUs).

25. The system of claim 24, wherein each of the ECUs is self configuring with current application software for the respective one of the plurality of connection nodes where it has been connected.

26. The system of claim 24, wherein the plurality of identification keys are each embedded in a plurality of fixed locations proximate the connection nodes.

27. The system of claim 26, wherein the identification keys are attached to respective ones of a plurality of wiring harnesses.

28. The system of claim 24, wherein each ECU includes a data structure having multiple sections, and each of the identification keys include a data structure corresponding to one of the sections of each ECU.

* * * * *